April 9, 1968  G. R. TREGONING ET AL  3,376,965
CONVEYORS

Filed June 17, 1966  4 Sheets-Sheet 1

United States Patent Office 3,376,965
Patented Apr. 9, 1968

3,376,965
CONVEYORS
Geoffrey R. Tregoning and Hugh Kenvyn Davies, London, England, assignors to Westinghouse Brake and Signal Company, Limited, London, England
Filed June 17, 1966, Ser. No. 558,350
Claims priority, application Great Britain, Jan. 10, 1966, 1,019/66
42 Claims. (Cl. 193—35)

ABSTRACT OF THE DISCLOSURE

A conveyor having an article support surface for supporting a body to be conveyed along the conveyor and at least one rotatable element mounted on the conveyor and operatively connected to the article support surface so that the speed at which the rotatable element rotates and the speed at which the body moves along the article support surface are interdependent. A restraining mechanism is operatively connected to the rotatable element to restrain the speed thereof, and thereby restrain relative motion between the rotatable element and the body as the latter moves along the article support surface. The restraining mechanism includes a brake apparatus mounted to be cyclically accelerated and decelerated, gearing means on the conveyor for interrelating the rotation of the rotatable element with the cyclic acceleration and deceleration of the braking apparatus so that at least two of the said cycles of the braking apparatus occur for each revolution of the rotatable element. The braking apparatus may be an inertial mass mounted for oscillating movement about an axis, the number of accelerations and decelerations, and thus the braking effect of the mass, increases as the rate of speed of the rotating element increases. The connection between the braking apparatus and the rotating element is a gearing means attached to the rotating element, and this may include a plurality of projections around its periphery and an oscillating member attached to the braking apparatus to cause acceleration and deceleration of the same. The oscillating member has engagement elements, one on each side of the axis about which the oscillating member oscillates, and engaging the projections on the cam.

---

This invention relates to means for restricting the speed of a body passing along a conveyor.

The present invention provides a conveyor having an element rotatable at a speed dependent upon the speed of a body passing along the conveyor, braking apparatus to cause in operation a braking effect on the body, and gearing mechanism whereby a plurality of such braking effects is effected for each revolution of the rotatable element, which gearing mechanism has means rotable with the rotatable element, said means having projections arranged round the axis about which the means is rotatable, and has an oscillatably mounted member having engagement elements arranged one on each side of the axis about which the member is oscillatable which engagement elements are engageable with the projections, the member being operatively connected to the braking apparatus.

The engagement elements may be sequentially engaged by the projections upon rotation of the means, thereby to cause oscillation of the member.

The braking apparatus may be directly connected to the member and arranged such that, in operation, the greater the rate of oscillation of the member the greater the braking force effected thereon. The braking apparatus may include an inertial mass, which mass is pivotable about its centre of gravity. In this case the inertial mass may be oscillatable about the axis about which the member is oscillatable.

The axis about which the member is oscillatable may be spaced from the axis of rotation of the rotatable element and may be parallel, or may be perpendicular to the axis of rotation of the rotatable element.

When the conveyor is a roller conveyor, the element may be constituted by a roller of the conveyor, and, in this specification the term "roller" is to be construed as including a plurality of wheel like elements arranged side by side for rotation about a common axis. The braking apparatus and gearing mechanism may be provided at one end of the conveyor roller or may be provided one at each end of a single roller. Where the element is constituted by a roller the rotatable means may be positioned between two sections of the element co-axially therewith. The rotatable means may be constituted by a pair of co-axial wheels on which collectively are provided the projections those provided on one wheel being staggered relative to those provided on the other wheel. In this case, one of the engagement elements may be arranged to be sequentially engaged upon rotation of the means by those of the projections which are on one of the wheels and the other of the engagement elements may be arranged to be sequentially engaged upon rotation of the means by those of the projections which are on the other of the wheels. When the braking apparatus includes an inertial mass pivotable about its centre of gravity, the mass may then be arranged for such pivoting about an axis at right angles to the axis of rotation of the rotatable element.

For convenience, the generic term "article supporting surface" is employed to describe the surface portions of the conveyor on which the body rests during its movement along the conveyor. The speed of movement of the body and the speed of movement of the article supporting surface are, of course, interdependent (that is, in driving or driven relationship with each other); and the speed of movement of the article supporting surface and the speed of movement of the said rotatable element are similarly interdependent. Thus, in effect, the speed of movement of the body along the conveyor and the speed of movement of the rotatable element are interdependent. For example, in the "roller" type conveyor mentioned above, the peripheral surfaces of the rollers or wheels which contact the body would collectively constitute the "article supporting surface" and elements rotatable with the rollers or wheels, for example, the shafts on which the rollers or wheels are rigidly mounted, would constitute the said "rotatable elements" which cooperate with the gearing mechanism in the aforesaid manner.

When the braking apparatus includes an inertial mass pivotable about its centre of gravity the axis about which the mass is pivotable may be spaced from and parallel to the axis about which the member is oscillatable. The inertial mass may be drivingly connected to the member for oscillation therewith by links interconnecting the member and the mass.

When the axis about which the member is oscillatable is spaced from and is parallel to the axis of rotation of the rotatable element and when the braking apparatus includes an inertial mass oscillatable about its centre of gravity, the rotatable means is positioned beween two sections of the element co-axially therewith and the axis about which the mass is oscillatable is perpendicular to the axis of rotation of the element. Conveniently, the member drivingly engages the mass and may do so by means of a tongue on the member engaging in a slot in the mass to one side of the axis about which the mass is oscillatable.

Embodiments of the present invention will now be described in greater detail, by way of example with reference to the accompanying drawings, of which:

Figures 2, 2A:
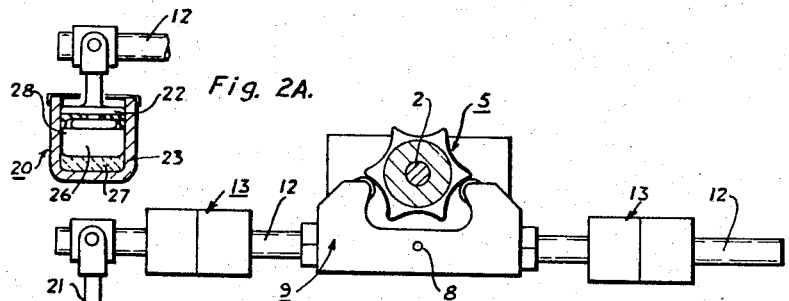
FIGURE 2 shows the embodiment of FIGURE 1 with damping means attached.
Figures 1B, 2B:
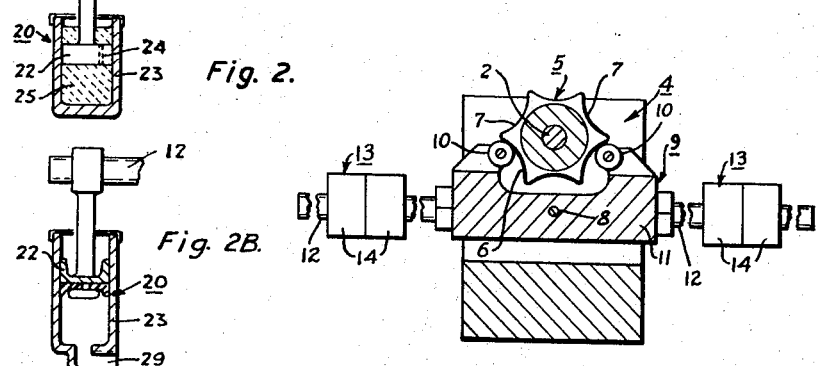
FIGURE 1B is a section view taken along line B—B of FIGURE 1A.

FIGURES 2A and 2B each show alternative constructions of the damping means.

Figures 1A, 3:
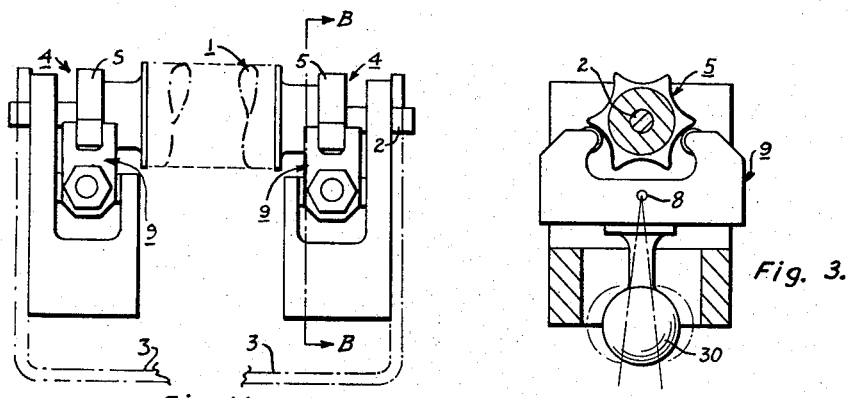
FIGURE 1A shows a portion of a conveyor including braking means according to the invention.

FIGURE 3 shows an alternative embodiment.

Figure 4:
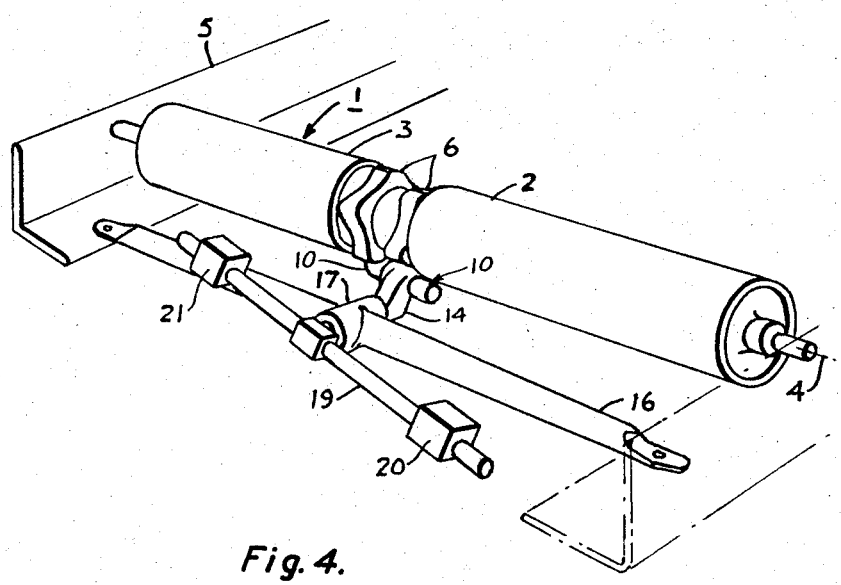
Figure 5:
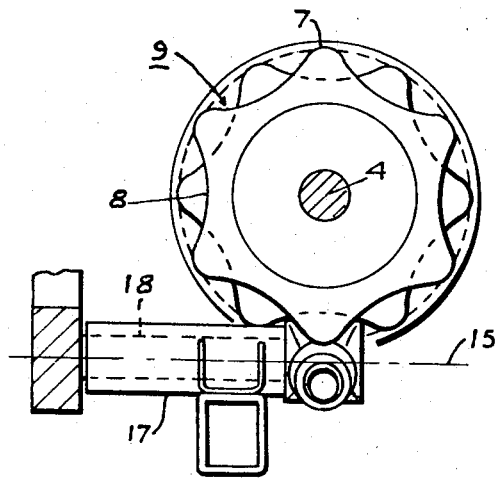
Figure 6:
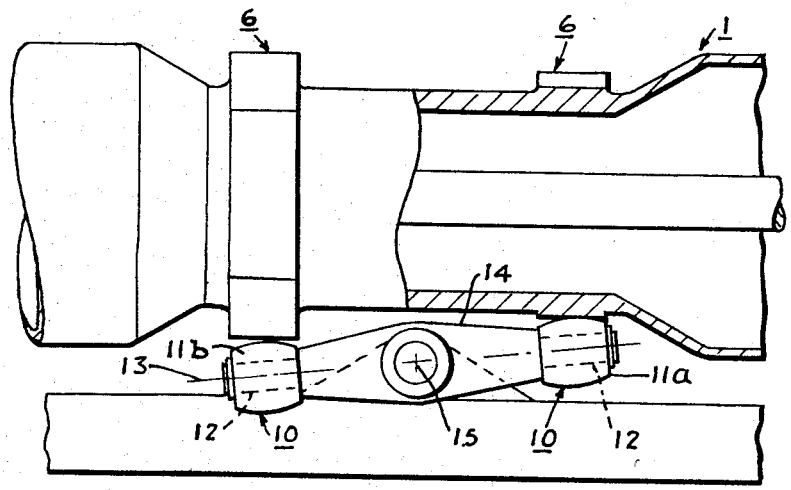

FIGURES 4, 5 and 6 show a further embodiment of the invention.

Figure 7:
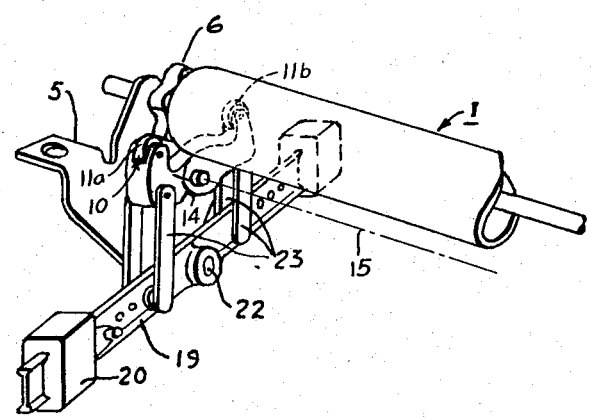

FIGURE 7 shows an embodiment with a single braking apparatus at one end of a conveyor roller.

Figure 8:
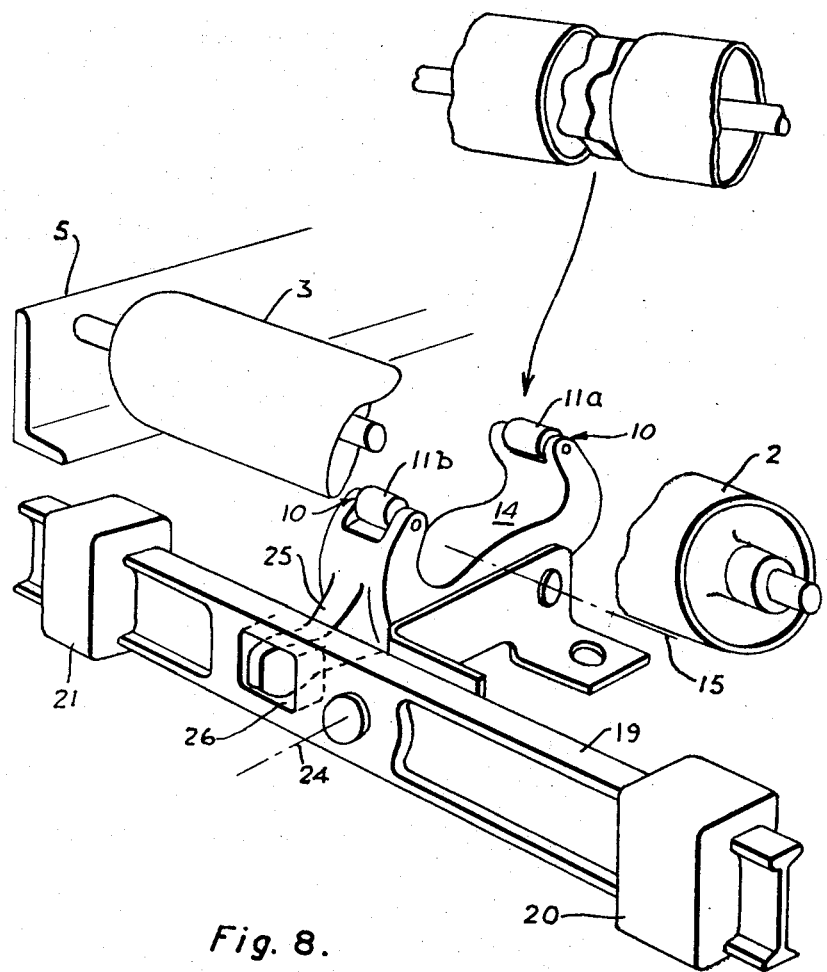

FIGURE 8 shows an alternative arrangement with the braking apparatus in the centre of a composite conveyor roller.

Referring firstly to FIGURES 1A and 1B, there is herein shown an element in the form of a roller 1 mounted for rotation about an axis 2 between the side frames 3 of a roller conveyor of which the remainder of the rollers have been omitted for the sake of clarity. At each end of the roller 1 is gearing mechanism 4 each of which comprises a means shown as a wheel 5 secured to the roller 1 and rotatable therewith about the axis 2. The wheel 5 has an indented peripheral face 6, the indentations of which provide a series of cam faces 7. Below the axis 2 is mounted for pivotal movement about an axis 8 extending parallel to and spaced from the axis 2, engagement element means 9. The engagement element means 9 carries two engagement elements 10 of which, at any given time, each is in engagement with a corresponding one of two different cam faces 7 on the wheel 5.

The engagement elements 10 are carried by a body 11 of the engagement element means 9, from which body 11 projects on each side of the axis 8 a screw threaded rod 12.

Also provided is an inertial mass which, in this embodiment, is constituted by two component masses 13 which, in each case, is formed by two nuts 14 critically engaged with the respective rods 12 so that the component masses 13 can be adjusted in their distances from the axis 8 and locked in position by screwing the two nuts 14 of each mass into engagement with each other to lock the nuts on the rod 12.

The above described apparatus operates as follows:

When the body passes along the conveyor, upon passing over the roller 1 the body will cause the roller 1 to be rotated about the axis 2. Such rotation of the roller 1 will rotate the wheel 5 to cause the component masses 13 to be oscillated through an arc through engagement of the engagement element means 9 with the cam faces 7 on the wheel 5. It will be seen that when the component masses 13 are firstly moved each in one angular direction, the masses are initially accelerated and then decelerated. Subsequently, the direction of movement of the component masses 13 will be reversed so that they are then initially accelerated and then decelerated in the opposite direction. Hence, the inertial mass constituted by the component masses 13 will be cyclically accelerated and decelerated by rotation of the element 1.

The gearing mechanism 4 will result in there being, in this embodiment, six cycles of acceleration and deceleration of the inertial mass. It will be appreciated that this acceleration and deceleration of the inertial mass will result in a resistance to the rotation of the roller 1, which, as a result and by virtue of its contact with the body passing along the conveyor, will exert the braking effect on the body. It will be obvious that the faster the body travels along the conveyor, the faster will it rotate the roller 1 and the greater will be the braking effect exerted on the body by the roller 1, due to the increasing resistance to the rotation of the roller 1 which will be exerted by the inertia or the inertia mass tending to resist its cyclic acceleration and deceleration.

Turning now to FIGURE 2, where like references indicate like parts to those above described, there may be connected to the inertia mass damping means 20. These damping means 20 may conveniently be provided by piston cylinder arrangement the piston rod 21 of which (as shown) is connected to one of the rods 12.

In the damping means shown in FIGURE 2, the piston rod 21 is connected to a piston 22 which has a sliding fit within the cylinder 23 of the arrangement and which has passing through it a bore 24 of restricted cross section. The cylinder 23 is filled with a liquid 25 and it will be seen that oscillation of the piston 22 within the cylinder 23 will tend to be resisted as liquid is forced through the bore 24 from one side of the piston 22 to the other as the rod 12 to which the piston rod 21 is connected, is oscillated as the engagement element means 9 is driven by the wheel 5.

In an alternative form of the damping means shown in FIGURE 2A, 22 is not provided with a bore passing therethrough and defines together with the cylinder 23 a closed volume 26 having therein a volume 27 of liquid and a volume 28 of gas. The volume 28 of gas is adjustable by the presence of a greater or lesser volume 27 of liquid.

In a further alternative embodiment of the piston and cylinder arrangement 20 which is shown in FIGURE 2B, the piston 22 again has no bore passing through it but the cylinder 23 has in inlet 29 through which can be introduced into the volume below the piston 22 gas of greater or lesser pressure.

Turning now to FIGURE 3, there is here shown a construction alternative to that of FIGURE 1 in that the inertia mass is, in this figure, constituted by a pendulum bob 30 suspended below the axis 2 and in line (in its midposition) with the two axes 2 and 8.

The embodiment of FIGURE 3 operates in the same manner as that of FIGURE 1.

It will be appreciated that the embodiment of FIGURE 3 may be modified by the addition of damping means of any of the types shown in FIGURE 2.

Referring now to FIGURES 4, 5 and 6, there is shown a composite conveyor roller 1 having two sections 2 and 3 mounted for rotation about an axis 4 between the side frames 5 of a roller conveyor system, the remainder of the conveyor being omitted for the sake of clarity. Between the sections 2 and 3 of the conveyor roller 1 there is secured two means shown as two wheels 6, the peripheral face 9 of which wheels 6 being shaped to form cams having lobes 7 and valleys 8 (see FIG. 5). The wheels 6 are secured co-axially to the sections 2 and 3 of the conveyor roller 1 such that the wheels 6 are rotatable with the conveyor roller 1 about the axis 4.

Referring to FIGURE 6, engagement element means 10 are provided which have cam follower rollers 11a and 11b which are rotatably mounted on pins 12 so as to rotate about axis 13. The engagement element means 10 are mounted on the member 14 which is reciprocably pivotable about the axis 15. The wheels 6 are fixed together with half pitch displacement of the cam lobes 7 as shown in FIGURE 5. The engagement element means 10 are mounted such that when one cam follower roller 11b is on top of a lobe 7 the other, 11a is in a valley 8, the mounting means being a support 16, see FIG. 4, which is rigidly secured to the conveyor side frames 5 of the conveyor system. In the support 16 there is provided a bearing piece 17 shown in FIGS. 4 and 5 within which is reciprocally pivotable a pivot pin portion 18 of the member 14. A ballast arm 19 is fastened to the pivot pin portion 18 of the member 14 such that motion is transmitted from the pivot pin portion 18 to the ballast arm 19. Weights 20 and 21 are attached by known means not shown to the ballast arm 19 at an equal distance from the axis 15, such that a line joining the centres of gravity of the weights 20 and 21 passes through the axis 15. The distance of the weights 20 and 21 from the axis 15 may be varied by known means (not shown).

This further embodiment works as follows: When a body passes along the conveyor under the influence of an external force such as gravity, on passing over the conveyor roller 1 it will cause the conveyor roller 1 to rotate about the axis 4. This causes the wheels 6 to rotate with the conveyor roller 1. As shown in FIG. 6, the engagement element means 10 has its right-hand roller 11a in a valley 8 and its left-hand roller 11b on a lobe 7. Rotation of the wheels 6 causes the roller 11a to rise up on to a lobe 7 and roller 11b to run into a valley 8, further rotation causing reversal of the movement so that roller 11a sinks to the next valley 8 on the wheel. Thus it will be seen that the engagement element means 10 and member 14 are oscillated about the axis 15. In the embodiment shown in FIGS. 4, 5 and 6 six such oscillations occur for each revolution of the wheels 6 but it is clear that the number of oscillations can be varied to choice by varying the number of lobes and valleys on the wheels.

The oscillation of the member 14 causes the ballast arm 19 and the weights 20 and 21 to oscillate so that the weights 20 and 21 will be accelerated and decelerated once per oscillation of six times per revolution of conveyor roller 1, providing inertial braking force as described previously.

Referring now to the embodiment shown in FIGURE 7, wherein like references indicate like parts to those described with reference to FIGS. 4, 5 and 6, one wheel 6 is provided at the end of the conveyor roller 1 mounted between the conveyor roller 1 and the side frame 5. The engagement element means 10 carries two cam follower rollers 11a and 11b, of which at a given time, each in engagement with a corresponding one of two different cam faces 9 of the wheel 6, such that when, for example, roller 11a is on a lobe, roller 11b is in a valley. Thus it can be seen that, when the wheel 6 rotates the cam follower rollers 11 alternate between a lobe 7 and a valley 8 causing the engagement element means 10 and member 14 to oscillate about the axis 15 which is parallel to the conveyor roller axis 4. Links 22 and 23 are pivotally mounted on the engagement element means 10 and pivotally mounted on the ballast arm 19 at their other ends, the ballast arm 19 being pivotally mounted on the axis 22. The links 23 provide a parallelogram linkage so that oscillatory motion of the engagement element means 10 is transferred to the ballast arm 19 and the weights 20 and 21.

In operation this embodiment performs in the same manner as the first described embodiment in that rotation of the wheel 6 causes the engagement element means 10 to oscillate a number of times for one revolution of the wheel 6 which motion is used to accelerate and decelerate the weights 20 and 21 the inertia of which weights effects the braking of the conveyor roller 1 as heretofore described.

In the embodiment shown in FIGURE 8, wherein like references indicate like parts to those previously described, one wheel 6 is provided mounted between two sections 2 and 3 of a conveyor roller 1 such that the wheel 6 is rotatable co-axially with the conveyor roller 1. As shown in the embodiment in FIG. 7, engagement element means 10 having two cam follower rollers 11a and 11b operating on the one wheel 6 are provided to cause the engagement element means 10 and member 14 to oscillate about the axis 15 in the manner described in the second embodiment. Integral with the member 14 is a tongue 25 which projects into a slot 26 in the ballast arm 19. The slot 26 is offset to one side of the pivotal axis 24 of the ballast arm 19 which axis 24 is perpendicular to the axis 15.

In operation the engagement element means 10 oscillates on rotation of the wheel 6 causing the tongue 25 to reciprocate which imparts an oscillatory motion to the ballast arm 19 about the axis 24. As described in the previous embodiments the inertia effects of the acceleration and deceleration of the weights 20 and 21 on rotation of the conveyor roller 1 are used to effect the braking of the conveyor roller 1.

Whilst in the above described embodiments, the wheel is stated as being secured to the roller 1 it may be integral therewith.

In the embodiments having the inertial mass the resistance to rotation of the roller 1 and, therefore, the braking effect which the roller 1 would exert on the body for any given speed thereof, may be adjusted by adjusting the distance of the component masses from the axis of oscillation.

To maintain a constant speed of the body as it travels along the conveyor, it would be desirable to install means for retaining the speed of the body at distances equal to the average length of the bodies which would pass along the conveyor in its use. However, a closer or wider spacing of the restraining means may be used.

Having thus described our invention what we claim is:

1. An elongated conveyor having a support structure and an article supporting surface for supporting a body and conveying the body therealong, at least one rotatable element mounted on the said support structure and operatively connected to said article supporting surface so that the speed at which the rotatable element rotates and the speed at which the said body moves along the article supporting surface are interdependent, restraining means operatively connected to said rotatable element for restraining the speed thereof, and thereby restraining relative motion between the said rotatable element and the said body as the latter moves along the article supporting surface, said restraining means including a braking means, means for mounting said braking means for cyclical acceleration and deceleration, and gearing means mounted on said conveyor for interrelating the rotation of the rotatable element with the cyclic acceleration and deceleration of the braking means so that at least two such cycles of the said braking means occur for each revolution of said rotatable element.

2. A conveyor as claimed in claim 1 wherein the gearing means includes a cam means rotatable with the rotating element, said cam means having projections arranged around the axis about which the means is rotatable, and said gearing means also including an oscillating member mounted for oscillating movement and having engagement elements arranged one on each side of the axis about which the member is oscillatable which engagement elements are engageable with the projections, the member being operatively connected to the braking means.

3. A conveyor as claimed in claim 2, in which the engagement elements are sequentially engaged by the projections upon rotation of the cam means, to cause oscillation of the member.

4. A conveyor as claimed in claim 2 in which the braking means is directly connected to the member such that as the rate of oscillation of the member increases the restraining force of the braking means upon the rotatable element also increases.

5. A conveyor as claimed in claim 3 in which the braking means includes an inertial mass which mass is mounted for movement about a pivot axis.

6. A conveyor as claimed in claim 5 in which the pivot axis of the inertial mass is substantially coincident with the axis about which the member is oscillatable.

7. A conveyor as claimed in claim 5 in which the pivot axis of the inertial mass is spaced from and substantially parallel to the axis about which the member is oscillatable.

8. A conveyor as claimed in claim 7 in which the inertial mass is drivingly connected to the member for oscillation therewith by links interconnecting the member and the mass.

9. A conveyor as claimed in claim 5 wherein the cyclic acceleration and deceleration of the inertial mass is achieved by reversal of the direction of movement of the mass.

10. A conveyor as claimed in claim 9, wherein such movement is linear.

11. A conveyor as claimed in claim 9 wherein such movement is angular.

12. A conveyor as claimed in claim 5 wherein the gearing means includes a wheel secured to and coaxial with the rotatable element, the wheel having an indented peripheral face the indentations of which provide a series of cam surfaces, and cam follower means having two cam followers of which at any given time, each cam follower is in engagement with a corresponding one of two different cam faces on the wheel.

13. A conveyor as claimed in claim 12 wherein the cam follower means is pivoted about an axis spaced from and substantially parallel to the axis about which the element is rotatable.

14. A conveyor as claimed in claim 13 wherein the mass comprises two component masses arranged one on each side of the axis about which the cam follower means is pivotable.

15. A conveyor as claimed in claim 14 wherein the line joining the center of gravities of the two component masses passes through the axis about which the cam follower is pivotable.

16. A conveyor as claimed in claim 13 including damping means connected to the inertial mass.

17. A conveyor as claimed in claim 16 wherein the damping means comprises a piston-and-cylinder arrangement.

18. A conveyor as claimed in claim 2 in which the axis about which the member is oscillatable is spaced from the axis of rotation of the rotatable element.

19. A conveyor as claimed in claim 2 in which the axis about which the member is oscillatable is substantially parallel to the axis of rotation of the rotatable element.

20. A conveyor as claimed in claim 19 wherein the braking means is an inertial mass movable about a pivot axis and in which the pivot axis of the inertial mass is substantially perpendicular to the axis of rotation of the rotatable element.

21. A conveyor as claimed in claim 20 in which the member drivingly engages the mass.

22. A conveyor as claimed in claim 21 in which the member engages the mass by means of a tongue on the member engaging in a slot in the mass to one side of the pivot axis of the mass.

23. A conveyor as claimed in claim 2 in which the axis about which the member is oscillatable is substantially perpendicular to the axis of rotation of the rotatable element.

24. A conveyor as claimed in claim 2 in which the rotatable element is constituted by a roller of the conveyor.

25. A conveyor as claimed in claim 24 in which the restraining means is provided at one end of the roller.

26. A conveyor as claimed in claim 24 including two restraining means one at each end of a single roller.

27. A conveyor as claimed in claim 24 in which the cam means of the gearing means is positioned between two sections of the said rotating element, co-axially therewith.

28. A conveyor as claimed in claim 27 in which the cam means is constituted by a pair of substantitally coaxial wheels on which collectively are provided the projections, those provided on one wheel being staggered relative to those provided on the other wheel.

29. A conveyor as claimed in claim 28, in which one of the engagement elements is arranged to be sequentially engaged upon rotation of the means by those of the projections which are on one of the wheels and the other of the engagement elements is arranged to be sequentially engaged upon rotation of the means by those of the projections which are on the other of the wheels.

30. A conveyor as claimed in claim 29 wherein the braking means is an inertial mass mounted to pivot about its center of gravity and wherein the mass is oscillatable about an axis substantially perpendicular to the axis of rotation of the rotatable element.

31. A conveyor as claimed in claim 1 in which the braking means includes an inertial mass which is mounted for movement about a pivot axis and wherein the cyclic acceleration and deceleration of the inertial mass is achieved by reversal of the direction of movement of the mass.

32. A conveyor as claimed in claim 31, wherein said movement is linear.

33. A conveyor as claimed in claim 31, wherein such movement is angular.

34. A conveyor as claimed in claim 33 wherein the mass comprises two component masses arranged one on each side of the axis about which the rotating element is rotatable.

35. A conveyor as claimed in claim 34 including means for adjusting the distance between each of the component masses and the axis about which the rotatable elements is rotatable.

36. A conveyor as claimed in claim 33 wherein the inertial mass is a pendulum bob suspended below the axis of the rotatable element.

37. A conveyor as claimed in claim 1 wherein the gearing means includes a wheel secured to and coaxial with the rotatable element, the wheel having an indented peripheral face the indentations of which provide a series of cam surfaces, and cam follower means having two cam followers of which at any given time, each cam follower is in engagement with a corresponding one of two different cam faces on the wheel.

38. A conveyor as claimed in claim 1 in which the braking means includes an inertial mass which is mounted for movement about a pivot axis and including damping means connected to the inertial mass.

39. A conveyor as claimed in claim 38 wherein the damping means comprises a piston-and-cylinder arrangement.

40. A conveyor as claimed in claim 39 wherein the piston and cylinder define a closed volume containing a gas and a liquid whereby the gaseous volume can be varied by varying the liquid volume.

41. A conveyor as claimed in claim 39 wherein the piston has extending therethrough a bore of limited crosssection and the cylinder is filled with liquid.

42. A conveyor as claimed in claim 39 wherein the piston and the cylinder define a volume into which can be introduced a gas, the pressure of which is controllable to vary the damping effect provided by the piston-and-cylinder arrangement.

References Cited

UNITED STATES PATENTS 1,432,375   10/1922   Witt _____ 74—1.5
1,690,646   11/1928   Meyer _____ 74—1.5

FOREIGN PATENTS 200,412   12/1965   Sweden.

ANDRES H. NIELSEN, *Primary Examiner.*